United States Patent [19]

Gardner et al.

[11] Patent Number: 5,528,097
[45] Date of Patent: Jun. 18, 1996

[54] SYSTEM FOR RECONDITIONING ROTOR ENDS IN ELECTRICAL GENERATORS

[75] Inventors: William C. Gardner, Winter Park; Robert L. Murphy, Orlando; Albert C. Sismour, Jr., Casselberry, all of Fla.

[73] Assignee: Westinghouse Electric Corporation, Pittsburgh, Pa.

[21] Appl. No.: 161,028

[22] Filed: Dec. 3, 1993

[51] Int. Cl.⁶ .................................................. H02K 3/46
[52] U.S. Cl. ............................ 310/270; 310/183; 310/214
[58] Field of Search ...................................... 310/270, 260, 310/183, 195, 214, 261, 271, 262

[56] References Cited

FOREIGN PATENT DOCUMENTS 0792489  12/1980  U.S.S.R. ................................ 310/270

*Primary Examiner*—R. Skudy

[57] ABSTRACT

A system for supporting a retaining ring on an end of body portion of a rotor in an electrodynamic system includes an end wedge which is adapted to be in contact with a retaining ring, a damper bar having a first surface which abuts the end wedge member and a second, oppositely facing surface; and a filler block positioned between the second surface of the damper bar and a field winding portion of a rotor. The filler block has a tapered surface which defines a stress-reducing gap between the field winding portion and the retaining ring, so as to minimize stress in the slot cell and field windings during high-speed rotation of the rotor.

12 Claims, 2 Drawing Sheets

5,528,097

SYSTEM FOR RECONDITIONING ROTOR ENDS IN ELECTRICAL GENERATORS

BACKGROUND OF THE INVENTION

1. Field of the Invention

This invention relates to a system and a method for efficiently reconditioning a rotor end in an electrical generator. More specifically, the invention relates to a system and a method for reconditioning a body end portion of such a rotor that does not require rewinding of the rotor.

2. Description of the Prior Art

After prolonged periods of use, some generator designs may require reconditioning for continued efficient performance. Among the different components that may require reconditioning is the end of the rotor body portion of the generator rotor, which is subject to stress-induced cracking at the top of the rotor winding teeth.

Typically, a long retaining ring attachment modification is used to recondition severely cracked rotor winding tooth tops. Such a modification, however, changes the support of the copper windings, which in turn affects the rotor slot cell. Many rotors are equipped with glass-epoxy-mica slot cells, which tend to be susceptible to cracking at high stresses. To protect against damage from the additional stresses which may be created by the long retaining ring modification, the rotor has typically been rewound as part of the reconditioning process with more flexible Nomex slot cells. Unfortunately, the process of rewinding the rotor is expensive and time consuming.

It is clear that there has existed a long and unfilled need in the prior art for a system and method for reconditioning end of the body portions of rotor assemblies which is less expensive and time consuming than systems and methods heretofore used.

SUMMARY OF THE INVENTION

Accordingly, it is an object of the invention to provide an improved system for reconditioning end of the body portions of generator rotor assemblies which is less expensive and time consuming to construct than systems heretofore used.

It is further an object of the invention to provide an improved method for reconditioning end of the body portions of generator rotor assemblies which is less expensive and time consuming to perform than methods heretofore known.

In order to achieve the above and other objects of the invention, a system for supporting a retaining ring on an end of the body portion of a rotor in an electrodynamic system includes an end wedge member which is adapted to contact a retaining ring; a damper bar having a first surface which abuts the end wedge member and a second, oppositely facing surface; and a filler block position between the second surface of the damper bar and an end winding portion of a rotor, the filler block having a tapered surface which defines a stress relieving gap between the field winding portion and the retaining ring, whereby stress within the slot cell is minimized during high speed rotation of the rotor.

According to a second aspect of the invention, a rotor end assembly for an electrodynamic system includes a rotor having a body and teeth defining slots; a retaining ring; an end wedge member in one of said slots which is in contact with the retaining ring; a damper bar having a first surface which abuts the end wedge member and a second, oppositely facing surface; and a filler block positioned between the second surface of the damper bar and a field winding portion of the rotor, the filler block having a tapered surface which defines a stress relieving gap between the field winding portion and the retaining ring, whereby stress within the slots, and particularly the slot cell, is minimized during high speed rotation of the rotor.

According to a third aspect of the invention, a method for making a retaining ring attachment to the end of a body portion of a rotor in an electrodynamic system includes the steps of positioning a filler block adjacent to a field winding of a rotor, the filler block having a tapered surface; fitting an end wedge member over the filler block; inserting a shim between the end wedge member and the filler block to fill a gap which is defined between the members as a result of the tapered surface; machining an outer surface of the end wedge member to a dimension which is adapted to fit a nose fit portion of a retaining ring; removing the shim; and positioning the end wedge member adjacent to the nose fit portion of the retaining ring, whereby the gap defined between the end wedge member and the filler block will relieve stress between the field winding portion and the retaining ring during operation of the electrodynamic system.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
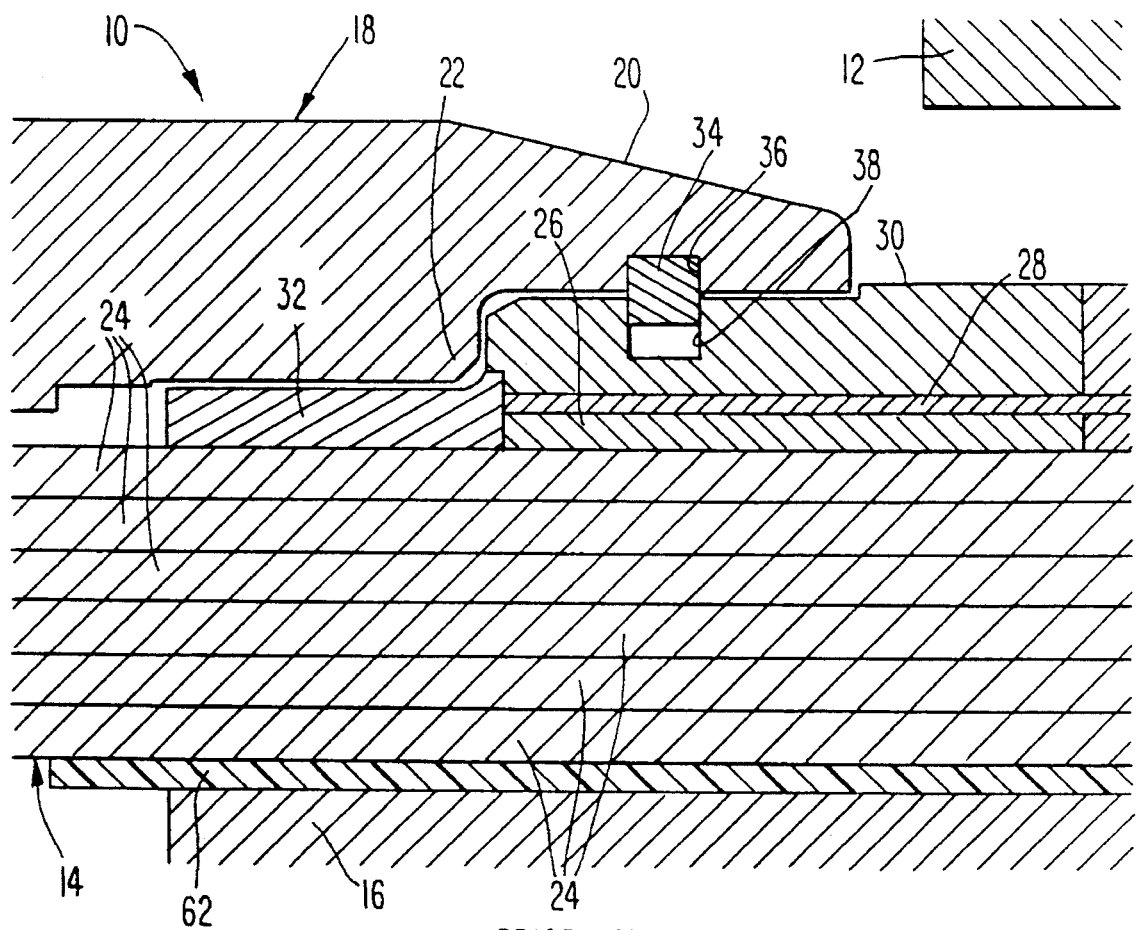
FIG. 1 is a fragmentary cross-sectional representation of the body end portion of a generator rotor assembly depicting a previously used system for reconditioning the body end portion of an electrical generator rotor.

Referring now to the drawings, wherein like reference numerals designate corresponding structure throughout the views, and referring in particular to FIG. 1, an electrodynamic system 10 such as an electrical generator includes a stator 12 and a rotor assembly which is mounted to rotate within the stator 12, the rotor assembly having a end of body winding portion 14. End of body winding portion 14 includes a number of axial slots defined in rotor body 16, which contain a slot cell 62, a number of copper rotor windings 24, a number of filler blocks 26 and a conductive damper bar 28, as may be seen in FIG. 1. Filler blocks 26 are constructed so that a first surface thereof bears against the upper surface of copper windings 24, and an opposite second surface thereof bears against the under side of conductive damper 28.

End of body winding portion 14 further includes an end filler block 32 having a lower surface which bears against the upper most surface of copper windings 24, and an upper surface which is adjacent a retaining ring 18.

Retaining ring 18 is longer than the retaining ring that was provided as original equipment on the generator, to reposition the key 34 inboard after removal of the tooth tops under the original retaining ring fit. Retaining ring 18 includes a nose portion 20 that is heated and then shrunk onto the outer surface of end wedge 30 and rotor body 16, and is keyed to end wedge 30 by means of key 34, which fits within a notch 36 defined in the nose portion 20 and in a corresponding notch 38 which is defined in end wedge 30. Retaining ring 18 is also keyed to rotor body 16.

The upper surface of end filler block 32 as it is depicted in FIG. 1 is machined, by a process using a shim, to conform to the outer dimensions of the rotor body 16 before the shim is removed.

During operation of the electrodynamic system 10, high speed rotation of the rotor creates centripetal acceleration which forces windings 24 outwardly. The deflection of the slot contents leads to stresses in slot cell 62 which previously necessitated a rewinding of the rotor with more flexible Nomex material.

Figure 2:
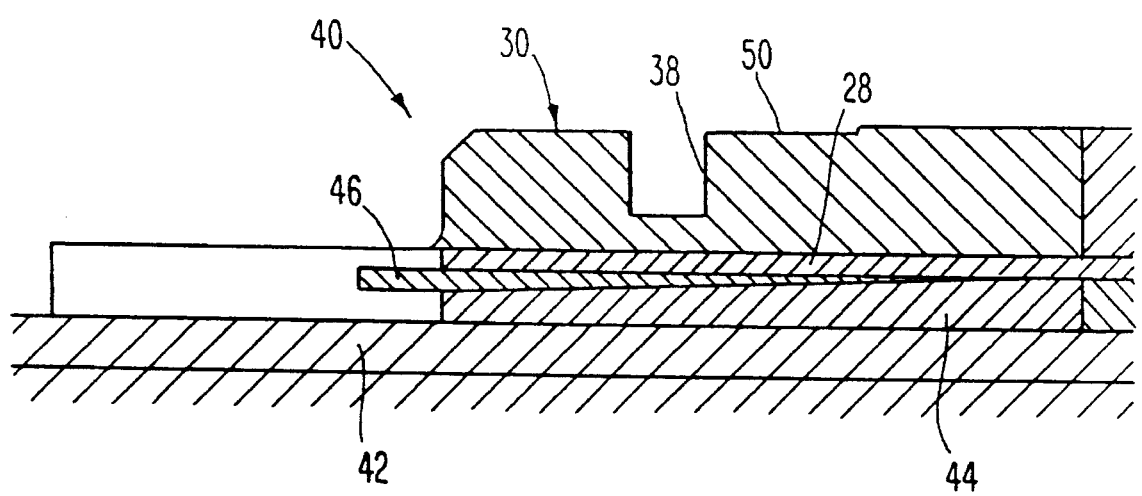
FIG. 2 is a fragmentary cross-sectional depiction of a rotor assembly which depicts a first step of a method according to the invention.
Figure 3:
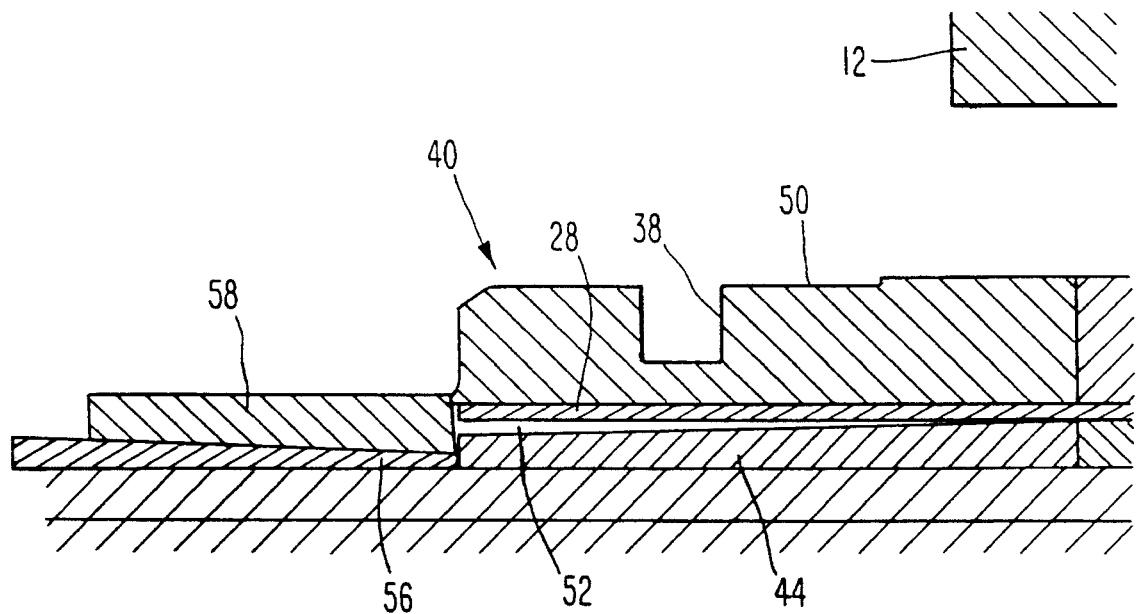
FIG. 3 is a view similar to FIG. 2, depicting a second step in the preferred method of the invention.
Figure 4:
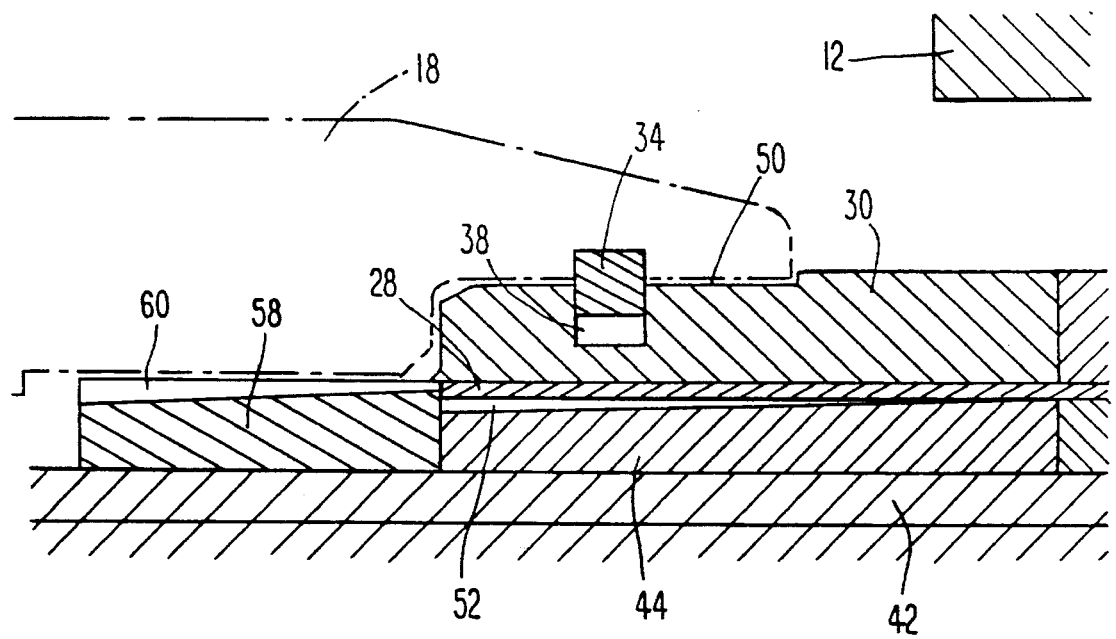
FIG. 4 is a view similar to FIGS. 2 and 3 depicting a third step of the preferred method according to the invention.

Referring to FIGS. 2–4, a method for constructing a rotor assembly 40 which reduces stress in the slot cell and which obviates the need for rewinding the rotor assembly during installation of retaining ring 18 is depicted. Referring first to FIG. 2, a tapered filler block 44 is positioned immediately above the top copper strap 42 of the original rotor windings. Tapered filler block 44 is not the end filler block 58, but is the interior filler block which is positioned immediately adjacent to the end filler block 58. Filler block 44 is tapered so as to be smaller in the vertical direction at the end of filler block 44 which is immediately adjacent to the end filler block 58.

To install a retaining ring 18 according to the preferred method of the invention, a tapered shim 46 is placed into the gap which is created between tapered filler block 44 and damper bar 28 to give solid, non-tapered support to end wedge 30. Once end wedge 30 is adequately supported, an outer surface 50 thereof is machined so as to fit snugly with the internal surface of the nose portion 20 of retaining ring 18. After outer surface 50 has been so machined, shim 46 is removed, and a shim 56 is positioned between the top copper strap 42 of the rotor windings and end filler block 58, which is inserted into the assembly 40 to the left of end wedge and tapered filler block 44, as viewed in FIG. 3.

Shim 56 is tapered so that it is vertically smaller at the end thereof which is adjacent to tapered block 44. Once shim 56 and end filler block 58 have been so positioned, end filler block 58 is machined so as conform to the counterturn portion 22 of retaining ring 18. Shim 56 is then removed.

Referring now to FIG. 4, retaining ring 181is then installed by shrink-fitting and is keyed at nose portion 20 to end wedge 30 and to rotor body 16.

It will be noted that a tapered gap 52 is thus provided between filler block 44 and damper bar 28, and that a similar gap 60 is provided between the end filler block 58 and the counterturn portion 22 of retaining ring 18. Gaps 52, 60 act to relieve stress on the rotor slot cell 62 and windings 24 in rotor assembly 40 during operation of the generator. Gaps 52, 60, in effect, smooth out the deflection of the slot cell over a longer bending length than was heretofore possible, thus reducing the possibility of bend-induced damage to the slot cell.

As a result of the stress reducing properties of the rotor assembly 40 which has been constructed according the invention, reconditioning of the end-of-rotor-body portion of the rotor assembly can be performed according to the invention without rewinding the rotor assembly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for supporting a retaining ring on a field winding portion of a rotor in an electrodynamic system, comprising:

an end wedge member which is adapted to contact a retaining ring;

a damper bar having a first surface which abuts said end wedge member and a second surface, said second surface oppositely facing said first surface; and a filler block positioned between said second surface of said damper bar and a field winding portion of a rotor, said filler block having a tapered surface which defines a stress-relieving gap between the field winding portion and the retaining ring, whereby stress in said system is minimized during high-speed rotation of the rotor.

2. A system according to claim 1, wherein said tapered surface is positioned adjacent to said second surface of said damper bar, said stress-relieving gap thereby being defined between said damper bar and said filler block.

3. A system according to claim 1, wherein said end wedge member is constructed and arranged to connect to a nose fit portion of the retaining ring.

4. A system according to claim 3, wherein said end wedge member is constructed and arranged to be keyed to the nose fit portion of the retaining ring.

5. A system according to claim 1, further comprising an end filler block adjacent to said filler block said end filler block being positioned between a counterturn portion of the retaining ring and the field winding portion of the rotor.

6. A system according to claim 5, wherein said end filler block is tapered so as to define a second stress-relieving gap between the counterturn portion of the retaining ring and the field winding portion of the rotor.

7. A rotor end assembly for an electrodynamic system, comprising:

a rotor having a body and teeth defining slots;

a retaining ring;

an end wedge member in one of said slots which is in contact with said retaining ring;

a damper bar having a first surface which abuts said end wedge member and a second surface, said second surface oppositely facing said first surface; and a filler block positioned between said second surface of said damper bar and a field winding portion of said rotor, said filler block having a tapered surface which defines a stress-relieving gap between the field winding portion and the retaining ring, whereby stress within said slot is minimized during high-speed rotation of the rotor.

8. An assembly according to claim 7, wherein said tapered surface is positioned adjacent to said second surface of said damper bar, said stress-relieving gap thereby being defined between said damper bar and said filler block.

9. An assembly according to claim 7, wherein said end wedge member is constructed and arranged to contact a nose fit portion of said retaining ring.

10. An assembly according to claim 9, wherein said end wedge member is constructed and arranged to be keyed to the nose fit portion of said retaining ring.

11. An assembly according to claim 7, further comprising an end filler block adjacent to said filler block, said end filler block being positioned between a counterturn portion of said retaining ring and said field winding portion of the rotor.

12. An assembly according to claim 11, wherein said end filler block is tapered so as to define a second stress-relieving gap between said counterturn portion of said retaining ring and said field winding portion of the rotor.

* * * * *